United States Patent
Bacardit

[11] Patent Number: 5,692,812
[45] Date of Patent: Dec. 2, 1997

[54] BRAKE REGULATOR WITH DOUBLE VALVE

[75] Inventor: Juan Simon Bacardit, Drancy, France

[73] Assignee: Bosch Systemes de Freinage, Drancy, France

[21] Appl. No.: 411,742

[22] PCT Filed: Mar. 17, 1995

[86] PCT No.: PCT/FR95/00322

§ 371 Date: Apr. 6, 1995

§ 102(e) Date: Apr. 6, 1995

[87] PCT Pub. No.: WO95/28308

PCT Pub. Date: Oct. 26, 1995

[30] Foreign Application Priority Data

Apr. 19, 1994 [FR] France .................. 94 04624

[51] Int. Cl.[6] .................. B60T 8/18; B60T 11/34
[52] U.S. Cl. .................. 303/9.62; 137/539.5; 188/195; 188/349; 303/9.69; 303/22.8; 303/84.1
[58] Field of Search .................. 303/22.1, 84.1, 303/84.2, 9.62, 9.67, 9.68, 9.69, 9.75, 22.8, 22.7, 22.2, 9.72, 6.01, 115.1, 115.4, 115.5, 116.4; 188/195, 349; 137/539, 539.5, 505.25; 60/591

[56] References Cited

U.S. PATENT DOCUMENTS

| 2,793,656 | 5/1957 | Frain et al. .................. 137/539.5 |
| 3,345,998 | 10/1967 | Dotto .................. 303/84.2 |
| 3,447,564 | 6/1969 | North et al. .................. 137/539.5 |
| 3,684,328 | 8/1972 | Koivunen .................. 303/115.1 |
| 3,900,230 | 8/1975 | Durling .................. 303/84.2 |
| 4,060,283 | 11/1977 | Demido et al. .................. 188/195 |
| 4,101,176 | 7/1978 | Carre et al. .................. 188/195 |
| 5,181,768 | 1/1993 | Wolff .................. 303/84.2 |
| 5,215,359 | 6/1993 | Burgdorf et al. .................. 303/115.4 |
| 5,246,277 | 9/1993 | Yamakoshi .................. 303/22.8 |
| 5,472,266 | 12/1995 | Volz et al. .................. 303/115.4 |

FOREIGN PATENT DOCUMENTS 0335764  10/1989  European Pat. Off. .
0461420  12/1991  European Pat. Off. .

*Primary Examiner*—Douglas C. Butler
*Attorney, Agent, or Firm*—Leo H. McCormick, Jr.

[57] ABSTRACT

A regulator (1) having a casing (10) with at least one bore (11) therein. A piston (12) slidably located within the bore (11) to delimit first (13) and second (14) chambers. The first (13) and second (14) chambers being separated from one another by a valve (15) carried on the piston (12) and actuated by a push rod (16). Valve (15) include first (151) and second (152) balls which have different diameters and are mounted in line with respect to corresponding first (155) and second (156) seats. First (153) and second (154) springs act on and urge the first (151) and second (152) balls toward the first (155) and second (156) seats. Fluid pressure from a source (2) being presented to the first (13) chamber and acting on the piston (12) to initially move the second (152) ball into engagement with the push rod (16) and move the second (152) ball off the second seat (156) and thereafter move the first (151) ball into engagement with the second (152) ball and off the first (155) seat to allow fluid pressure to be communicated to the second (14) chamber by flowing past the first (155) and second (156) seats for distribution to a brake system (3).

4 Claims, 3 Drawing Sheets

BRAKE REGULATOR WITH DOUBLE VALVE

The present invention relates to a brake regulator, intended to be interposed between a source of hydraulic pressure and a braking circuit of a motor vehicle and including a casing provided with at least one bore; a hydraulic piston sliding in this bore and therein delimiting first and second pressure chambers separated from one another by valve means carried by this piston, the first and second chambers being capable of being connected respectively to the source of pressure and to the braking circuit; and a push rod acting on the valve means in a direction capable of allowing the opening thereof when a relatively low pressure prevails in the second chamber, the piston sliding in the bore, under the action of an increase in pressure in this second chamber, in a direction capable of moving the push rod away from the valve means and correspondingly allowing closure thereof, these valve means comprising a first ball of predetermined diameter, urged by a first spring in the direction both of the push rod and of a first seat formed inside the piston.

Regulators of this type are known in the prior art, such as illustrated, for example, by the patent documents U.S. Pat. No. 4,615,566; U.S. Pat. No. 4,624,507; and EP 0,223,641.

One of the problems encountered in the production of regulators of this type lies in the fact that the brake fluid is often contaminated by all sorts of dirt, which can oppose the closure of the valve and consequently prevent it from fulfilling its function.

Although it is known to interpose filters in the path of the brake fluid, in order to solve this problem, this solution remains not very satisfactory insofar as the filters easily trap quite significant quantities of air, which themselves disturb the correct operation of the hydraulic braking circuit.

Moreover, the operation of a brake regulator is generally accompanied by a noticeable noise, which motor vehicle manufacturers are seeking to eliminate.

Within this context, the object of the invention is to propose a silent and robust regulator, capable of operating without failure, even in the absence of a filter for the brake fluid.

To this end, the regulator of the invention is essentially characterized in that the valve means comprise a second ball interposed between the first ball and the push rod, interacting with a second seat formed inside the piston, and urged by a second spring in the direction both of the push rod and of the second seat, this second ball being moved away from the second seat by the push rod and itself moving the first ball away from the first seat when a relatively low pressure prevails in the second chamber, and the distance separating the two balls, when they are applied to their respective seats, being less than the possible sliding travel of the piston in the bore.

According to the simplest embodiment of the invention, the second spring is compressed between the two balls and the two springs exhibit different stiffnesses, the stiffness of the second spring being less than that of the first, and the second ball exhibits a diameter less than the diameter of the first ball.

Other characteristics and advantages of the invention will emerge clearly from the description thereof which is given hereafter, by way of non-limiting indication, with reference to the appended drawings, in which.

Figure 1:
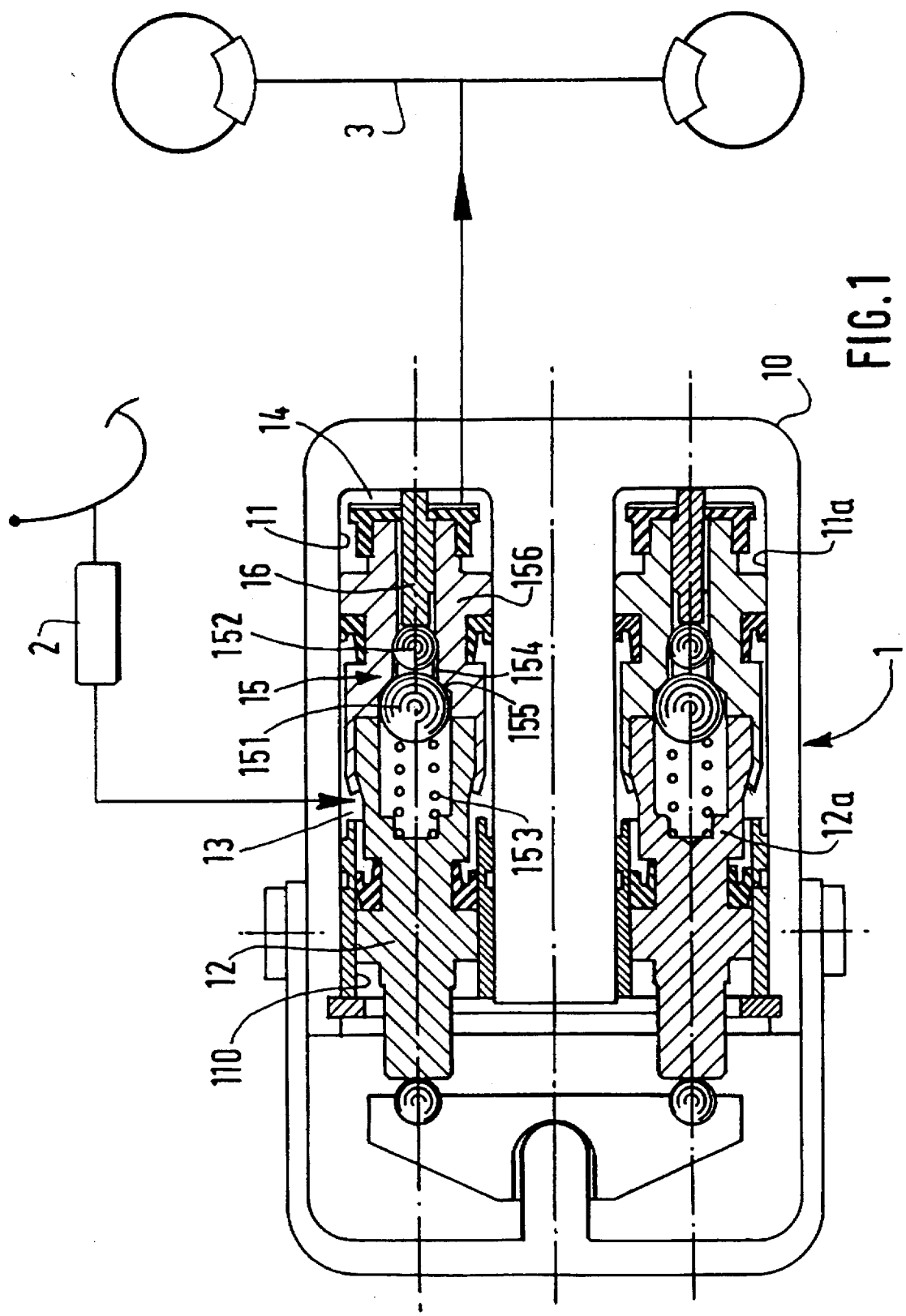
FIG. 1 is an overall sectional view of a regulator in accordance with the invention.

As shown in FIG. 1, the invention relates to a brake regulator 1, intended to be interposed between a source of hydraulic pressure, such as a master cylinder 2, and the rear brake circuit 3 of a motor vehicle, so as to supply to this brake circuit 3 a pressure equal to the output pressure of the source of pressure for the low values of this pressure, and a pressure less than that of the source for higher values of the latter.

This regulator comprises, in a way which is conventional, a casing 10 provided with at least one bore 11, a hydraulic piston 12 sliding in this bore and therein delimiting first and second pressure chambers 13 and 14 separated from one another by valve means 15 carried by this piston 12.

In the embodiment represented in FIG. 1, the regulator in fact comprises two bores 11 and 11a, the components housed in the bore 11a being similar in every respect to those which are housed in the bore 11 and identified by the same reference numeral, apart from the "a" index.

In operation, the first and second chambers 13, 14 are respectively connected to the source of pressure 2 and the brake circuit 3.

A push rod 16 connected to the casing 1 acts on the valve means 15 in a direction capable of allowing opening thereof where relatively low pressure prevails in the second chamber 14, and the piston 12 slides in the bore 11, under the effect of a rise in pressure in this second chamber 14, in a direction capable of moving the valve means 15 away from the push rod 16 and correspondingly allowing closure thereof.

To this end, according to a conventional design, the piston 12 is, for example, a differential piston exhibiting, in the first chamber 13 on the opposite side from the second 14, a pressure section defined by a bore 110 and less than that of the bore 11.

As shown by the figures, the valve means 15 comprise a first ball 151 of predetermined diameter, urged by a first spring 153 in the direction both of the push rod 16 and of a first seat 155 formed inside the piston.

These valve means moreover comprise a second ball 152 which, in FIGS. 1 to 4, is represented with a diameter less than the diameter of the first ball 151, which is interposed between this first ball 151 and the push rod 16, which interacts with a second seat 156 formed inside the piston, and which is urged by a second spring 154 in the direction both of the push rod 16 and of the second seat 156.

Figure 2:
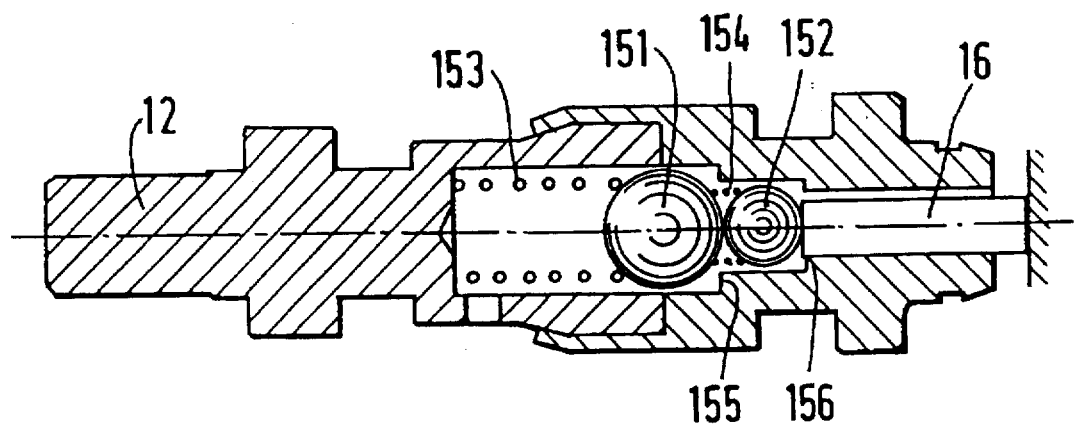
FIG. 2 is an enlarged detail view of a part of FIG. 1, representing the piston in a first position.

FIG. 2 represents the position adopted by the valve means 15 relative to the push rod 16 when a relatively low pressure prevails in the second chamber 14, and shows that the second ball 152 is then moved away from the second seat 156 by the push rod 16 and that it itself moves the first ball 151 away from the first seat 155.

Figure 3:
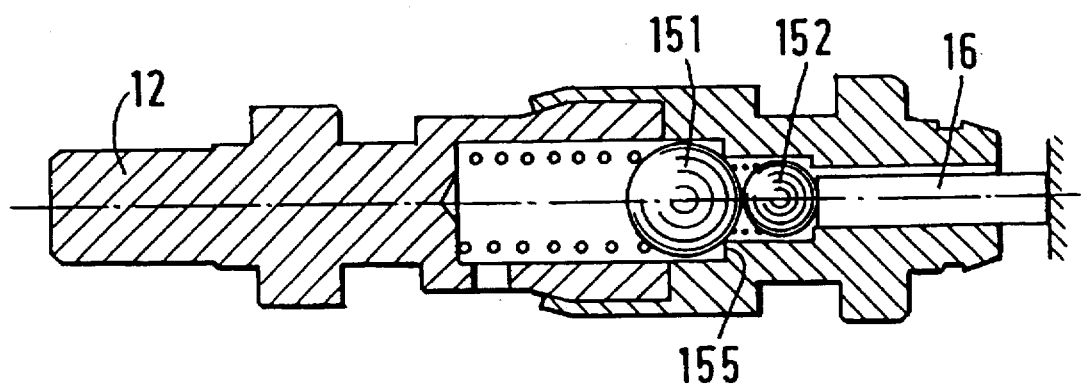
FIG. 3 is an enlarged detail view of a part of FIG. 1, representing the piston in a second position.

FIG. 3 represents the position adopted by the valve means 15 relative to the push rod 16 when the pressure prevailing in the second chamber 14 has increased sufficiently, owing to an increase in pressure in the first chamber 13, for the first ball 151 to close off the first seat 155.

In this figure, it is possible to see that the second ball 152 is not, for its part, necessarily applied to its seat 156.

If the closing-off performed by the first ball 151 is imperfect, owing, for example, to the presence of dirt 17 on the first seat 155, the brake fluid present in the first chamber continues to migrate into the second chamber and to increase the pressure in the latter.

Figure 4:
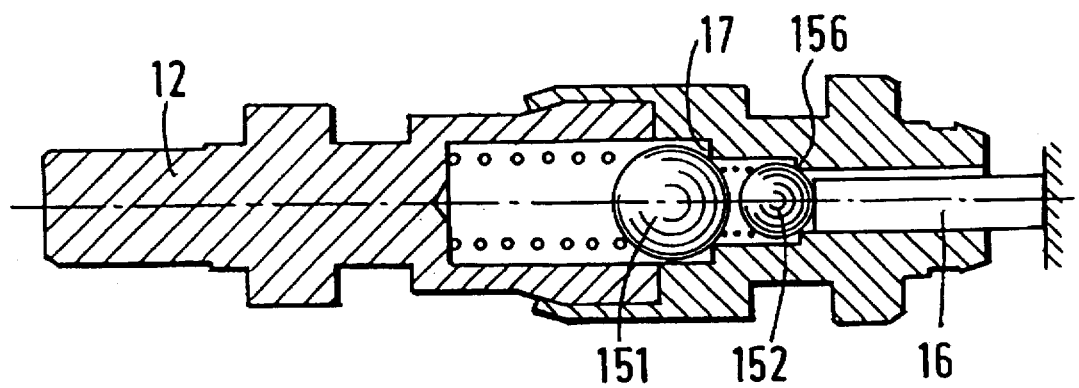
FIG. 4 is an enlarged detail view of a part of FIG. 1, representing the piston in a third position.

In this case, as FIG. 4 shows, the piston 12 continues to move with respect to the push rod 16 until the second ball 152 closes off the second seat 156, this figure making it possible to see that the distance separating the two balls, when these are applied to their respective seats, is less than the sliding travel carried out by the piston in the bore between its position of rest illustrated in FIG. 2 and its extreme position illustrated in FIG. 4.

As shown in FIGS. 2 to 6, the second spring 154 is preferably compressed between the two balls 151 and 152, the second spring then having to have a stiffness less than that of the first spring 153 so that the first and second balls become applied to their seat in the desired order, illustrated by the figures.

Figure 5:
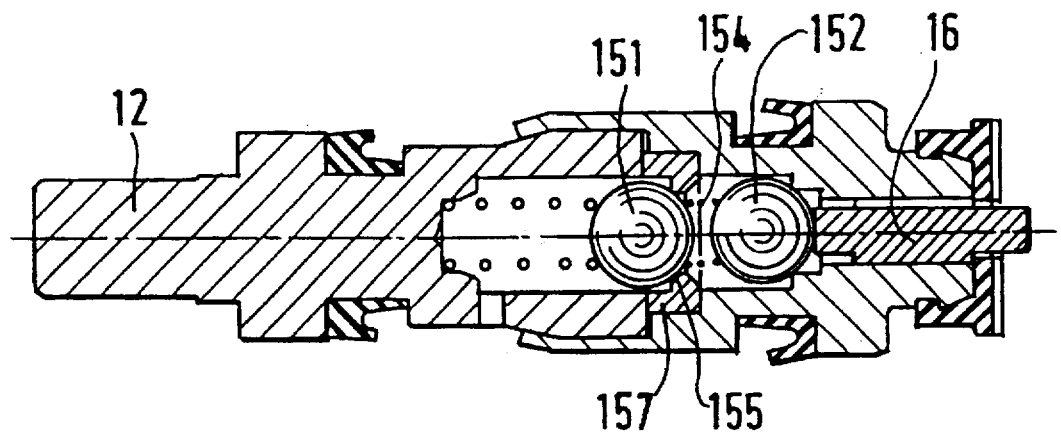
FIG. 5 is an enlarged detail view of a part of FIG. 1, representing a second possible embodiment of the piston.
Figure 6:
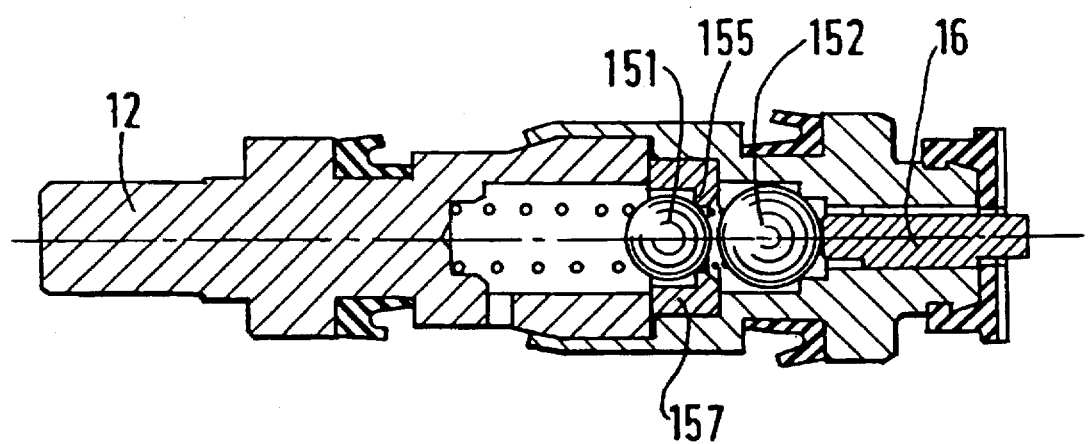
FIG. 6 is an enlarged detail view of a part of FIG. 1, representing a third possible embodiment of the piston.

FIGS. 5 and 6 show that it is equally possible to give the second ball 152 the same diameter as that of the first ball (FIG. 5), or even a greater diameter (FIG. 6), these embodiments however requiring the addition of an additional component 157 bearing the seat 155 for the first ball 151.

Aside from the increase in reliability which results from the use of the second ball, the presence of the latter divides the pressure difference existing between the first and second pressure chambers 13 and 14 into a first pressure drop brought about by the first ball 151 and its seat 155, and a second pressure drop brought about by the second ball 152 and its seat 156.

Now, experience has shown that this effect led to an equalling-out of the flow rate of brake fluid between the first and second pressure chambers, which results in a much quieter operation of the regulator.

We claim:

1. A brake regulator located between a source of hydraulic pressure and a braking circuit of a motor vehicle, said regulator having a casing with at least one bore, a hydraulic piston sliding in said bore to delimit first and second pressure chambers, said first and second pressure chambers being separated from one another by valve means carried by said piston, said first and second pressure chambers being capable of being connected, respectively, to said source of pressure and said braking circuit; a push rod acting on the valve means in a direction capable of opening said valve means when a relatively low pressure prevails in said second chamber, said piston sliding in the bore in response to an increase in pressure in said second chamber and moving said valve means away from said rod for correspondingly allowing closure of said valve means, said valve means comprising: a first ball having a predetermined diameter, said first ball being urged by a first spring in the direction toward both said push rod and a first seat formed inside of said piston, a second ball interposed between said first ball and said push rod, said second ball reacting with a second seat formed inside the piston, said second ball being urged by a second spring in the direction toward both said push rod and said second seat, said second ball separating from said second seat on engagement with said push rod to correspondingly engage and separate said first ball from said first seat in response to a relatively low pressure in said second chamber to allow communication between said first chamber and said second chamber past said first and second seats.

2. The brake regulator according to claim 1, characterized in that said second spring is compressed between said first and second balls and in that said first and second springs exhibit different stiffnesses with the stiffness of said second spring being less than that of said first spring.

3. The brake regulator according to claim 1, characterized in that said second ball exhibits a diameter less than the diameter of said first ball.

4. The brake regulator as according to claim 1, wherein a distance separating said first and second balls when respectively engaging said first and second seats is less than the possible sliding travel of said piston in said bore.

* * * * *